G. H. JOSLIN.
SELF STARTING DIE MACHINE.
APPLICATION FILED JUNE 25, 1915.

1,190,768.

Patented July 11, 1916.
2 SHEETS—SHEET 1.

Witnesses:
C. Feinle, Jr.
D. W. Gould

Inventor,
George H. Joslin.
By Victor J. Evans,
Attorney.

UNITED STATES PATENT OFFICE.

GEORGE H. JOSLIN, OF TERRE HAUTE, INDIANA.

SELF-STARTING DIE-MACHINE.

1,190,768.  Specification of Letters Patent.  Patented July 11, 1916.

Application filed June 25, 1915. Serial No. 36,280.

*To all whom it may concern:*

Be it known that I, GEORGE H. JOSLIN, a citizen of the United States, residing at Terre Haute, in the county of Vigo and State of Indiana, have invented new and useful Improvements in Self-Starting Die-Machines, of which the following is a specification.

The invention relates to a threading machine adapted for threading any size pipe within the range of the machine and with any one of a plurality of standard thread pitches, the desired pitch being selected, whereby to provide in a single machine what has heretofore required any number of machines to perform.

The structure involves a threading machine in which the starting screw which operates the die head and feeds the same in accordance with the pitch desired is adapted for coöperation with any one of a plurality of feeding means in the form of split nuts each having a distinct thread passage, so that the screw is fed directly in accordance with the particular selected thread passage.

Figure 1:
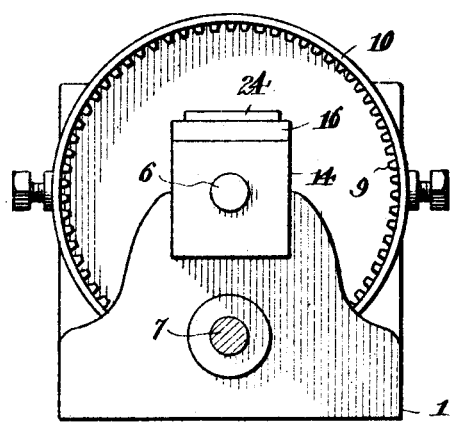
Figure 2:
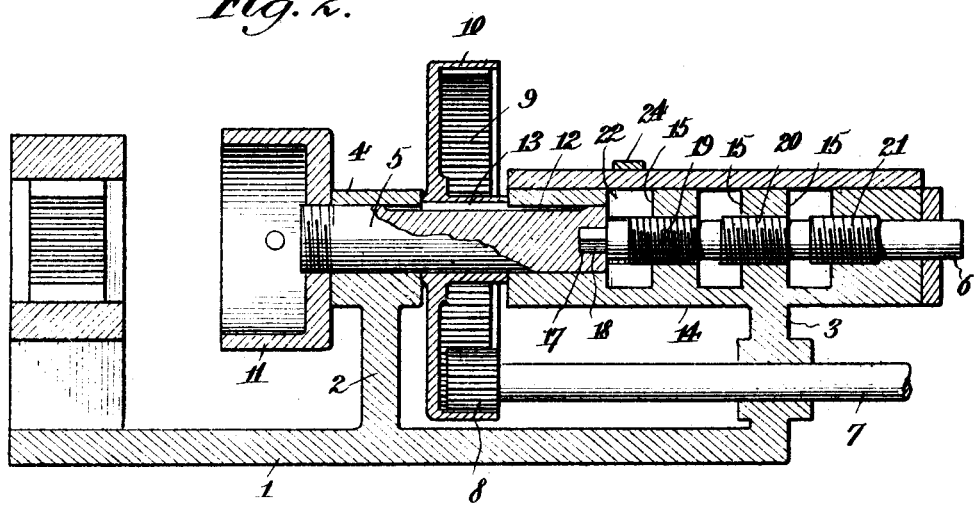
Figure 3:
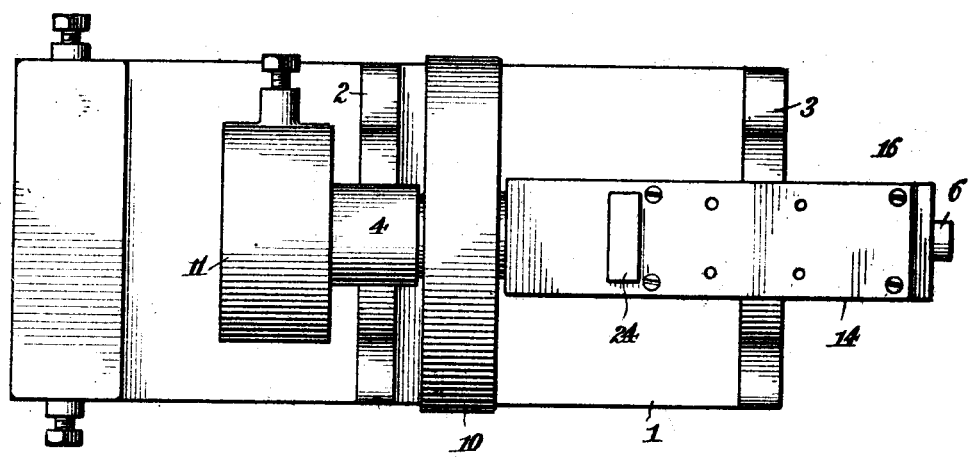
Figure 4:
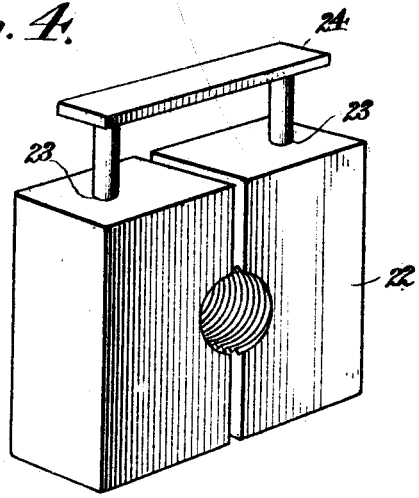

The invention in the preferred form of details will be described in the following specification, reference being had particularly to the accompanying drawings, in which:

Figure 1 is a view in elevation of the machine; Fig. 2 is a longitudinal section of the same; Fig. 3 is a plan of the device; Fig. 4 is a perspective view of one of the split nuts with its holding means.

In the accompanying drawings wherein I have shown the preferred form of machine and one particularly adapted for hand power, 1 represents a base frame including uprights 2 and 3, the former supporting a bearing 4 for the die head spindle 5 and the latter supporting the starting screw 6, as will later appear.

The upright 3 also is formed to provide a bearing for a driving shaft 7 which extends longitudinally of the frame and is terminally provided adjacent the upright 2 with a pinion 8 adapted to mesh with the internal teeth 9 of a gear 10. The spindle 5 is rotatably and slidably mounted in the bearing 5, being provided at its outer end with a die head 11. The spindle 5 is formed with a longitudinal key way 12 and the gear 10 is keyed thereon as at 13 so as to permit independent longitudinal movement of the spindle while preventing independent rotative movement. The upright 3 terminates in a head 14 longitudinally cored to receive the starting screw 6. The head 14 is formed with a plurality of transverse channels or openings 15, the said openings extending from side to side through the head and through the top, a cover plate 16 being secured upon the top of the head. The inner or rear end of the spindle 5 is formed with a socket 17 of annular form in cross section and the starting screw 6 has a projection 18 to fit the socket.

The starting screw is formed at different places throughout its length with a series of externally arranged threads 19, 20 and 21, these threads being of a distinctly different pitch. Mounted in each of the openings 15 are feeding nuts 22 having internally threaded bores, as shown. Each nut is threaded in direct accordance with the pitch of the threaded section of the starting screw immediately adjacent thereto. The nuts are in two halves, that is, divided vertically through the bore and are additionally formed with vertically extending openings 23. A locking means in the form of a stirrup 24 is formed to engage each of the nuts, the spread of the stirrup prongs being such that when the prongs thereof engage in the openings 23 the sections of the particular nut will be so spaced as to prevent its coöperation with the threads on the shaft, while when the prongs straddle the nut sections and engage the outer surface of such sections the nut will be clamped or held in threaded coöperation with the shaft. The cross bars of the stirrups rest upon the cover plate 16.

From the above description it will be obvious that through the rotation of the drive shaft the spindle 5 will be operated, and that when the nut having the desired pitch of thread clamped in position to coöperate with the threads on the starting shaft, the latter in the rotation of the spindle will be forced forward carrying the spindle with it, the feed being in strict accordance with the pitch of the feeding nut. As a plurality of such feeding nuts, any desired number being contemplated are used, it is of course apparent that the threading may be done at any particular pitch.

What is claimed is:

1. A threading machine involving a die head spindle, a starting screw for feeding the spindle longitudinally and formed with a threaded section, a split nut for coöperation with said section, and an element coöperating with the outer edges of the split nut for holding said nut in threaded engagement with the threaded section of the screw, said nut sections being formed intermediate their edges to permit engagement by the element to hold the sections spread with relation to the threaded section of the screw.

2. A threading machine involving a die head spindle, a starting screw for feeding the spindle longitudinally, said screw being formed with a plurality of threaded sections, a split nut for coöperation with each section, the sections of the nut being formed with openings, and a stirrup to engage said openings to hold the sections of the nut in spread relation with respect to the screw.

3. A threading machine involving a die head spindle, a starting screw for feeding the spindle longitudinally, said screw being formed with a plurality of threaded sections, a split nut for coöperation with each section, the sections of the nut being formed with openings, and a stirrup to engage said openings to hold the sections of the nut in spread relation with respect to the screw, said stirrup being adapted to be engaged by the outer edges of the nut sections to hold said nut in screw engaging position.

In testimony whereof I affix my signature in presence of two witnesses.

GEORGE H. JOSLIN.

Witnesses:
JOHN MINDRUP,
HENRY F. SCHMIDT.